(12) United States Patent
Toba et al.

(10) Patent No.: US 9,507,895 B2
(45) Date of Patent: Nov. 29, 2016

(54) SIMULATION APPARATUS AND SIMULATION METHOD FOR DETERMINING SOFT ERROR RATES FOR A CONFIGURED MODEL

(75) Inventors: Tadanobu Toba, Yokohama (JP); Kenichi Shimbo, Yokohama (JP); Hidefumi Ibe, Kawasaki (JP); Hideki Osaka, Oiso (JP)

(73) Assignee: HITACHI, LTD., Tokyo (JP)

( * ) Notice: Subject to any disclaimer, the term of this patent is extended or adjusted under 35 U.S.C. 154(b) by 938 days.

(21) Appl. No.: 13/702,636

(22) PCT Filed: May 13, 2011

(86) PCT No.: PCT/JP2011/002662
§ 371 (c)(1),
(2), (4) Date: Jan. 22, 2013

(87) PCT Pub. No.: WO2011/155124
PCT Pub. Date: Dec. 15, 2011

(65) Prior Publication Data
US 2013/0132056 A1 May 23, 2013

(30) Foreign Application Priority Data
Jun. 8, 2010 (JP) .................................. 2010-130622

(51) Int. Cl.
*G06F 17/50* (2006.01)
*G06G 7/62* (2006.01)
*G01R 31/3181* (2006.01)

(52) U.S. Cl.
CPC ..... *G06F 17/5036* (2013.01); *G01R 31/31816* (2013.01); *G06F 17/5022* (2013.01); *G06F 2217/70* (2013.01)

(58) Field of Classification Search
CPC ................... G01R 31/3181; G01R 31/31816; G06F 2217/70; G06F 17/5022; G06F 17/5036

USPC ................................. 703/17, 16, 15, 14, 13
See application file for complete search history.

(56) References Cited

U.S. PATENT DOCUMENTS

| | | | | |
|---|---|---|---|---|
| 7,644,311 B2* | 1/2010 | Lien | ................. | G01R 31/31816 703/13 |
| 2007/0234125 A1* | 10/2007 | Lien | ................. | G01R 31/31816 714/37 |
| 2010/0083203 A1* | 4/2010 | Bose | ................... | G06F 17/5036 716/113 |

FOREIGN PATENT DOCUMENTS

| | | |
|---|---|---|
| JP | 2004-138529 | 5/2004 |
| JP | 2006-134938 | 5/2006 |
| JP | 2007-4216 | 1/2007 |
| WO | WO 2007/034548 A1 | 3/2007 |

OTHER PUBLICATIONS

Sugihara, Makato et al., "A Simulation-Based Soft Error Estimation Methodology for Computer Systems", 2006, Proceedings of the 7th International Symposium on Quality Electronic Design, IEEE.*

(Continued)

*Primary Examiner* — Cedric D Johnson
(74) *Attorney, Agent, or Firm* — Baker Botts L.L.P.

(57) ABSTRACT

A simulation apparatus includes a discrete events simulation section to perform a discrete type simulation of components of a configured model as defined based on attribute information that is information on parts of the components of the defined configured model and connection information showing a connectional relationship among the components of the defined configured model; and a soft error rate computation processing section to compute a soft error rate of the defined configured model based on the simulation result of the discrete events simulation section and data on soft error rates in the attribute information.

9 Claims, 15 Drawing Sheets

(56) References Cited

OTHER PUBLICATIONS

Muhkerjee, Shubhendu S. et al., "A Systematic Methodology to Compute the Architectural Vulnerability Factors for a High-Performance Microprocessor", 2003, Proceedings of the 36th International Symposium on Microarchitecture, IEEE.*

Shivakumar, Premkishore et al., "Modeling the Effect of Technology Trends on the Soft Error Rate of Combinational Logic", 2002, Proceedings of the International Conference on Dependable Systems and Networks, IEEE.*

Hiromi Tanaka et al., Development of a Simulator for Queueing Networks.

Makoto Sugihara et al., A Simulation-Based Soft Error Estimation Methodoloogy for Computer Systems, Proc. of International Symposium on Quality Electronic Design, Mar. 2006, pp. 196-203.

* cited by examiner

F I G . 5
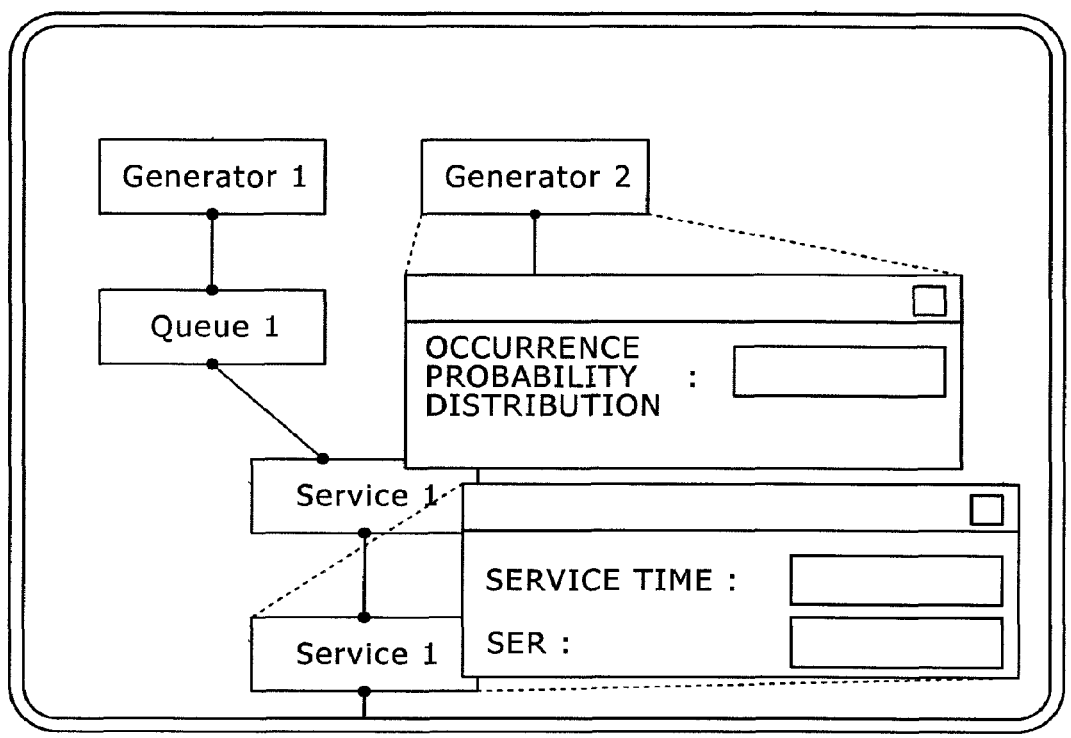

SIMULATION APPARATUS AND SIMULATION METHOD FOR DETERMINING SOFT ERROR RATES FOR A CONFIGURED MODEL

TECHNICAL FIELD

The present invention relates to promoting the high-reliability of the electronic appliances in general, especially pertaining to a simulation apparatus and the same method for aiding the designing of soft errors countermeasures resulting from environmental radiation upon such appliances being designed.

BACKGROUND ART

According as the semiconductor devices are further miniaturized, the problems with soft errors resulting from environmental radiation such as cosmic-ray terrestrial neutrons and α rays have come to the surface especially for SRAMs, logic gates, clock systems and so forth. When a neutron having an extremely high energy plunges into atomic nuclei comprising such devices, nucleons (neutrons, protons) in the nuclei repeatedly impinge on one another so that nucleons having a particularly higher energy are released from the nuclei. When the nucleons are placed in the state where they have no more kinetic energy to plunge out of the nuclei, the process in which light particles such as protons, neutrons, deuterons, alpha particulates are evaporated from the remained nuclei in excitement continues, with the result that due to the fact that the remained nuclei also have a recoil energy, those secondary particles as a whole fly within the devices by a distance corresponding to their specific ranges.

When α rays generated from radioisotopes contained in the semiconductor packages and the secondary ions having a charge resulting from nuclear reaction pass through the depletion layer of the storage node of an SRAM in the 'high' state, electrons are absorbed by the node; electron holes flow oppositely to the normal direction; and the charge is collected at the storage node through the funneling mechanism by which a charge collection region expands along the tracks of the ions. As the result of it, when the charge more than the critical charge is collected thereat, the 'high' state transits to the 'low' state so as to cause a soft error (hereinafter referred to as SEU or abbreviation of Single Event Upset).

This is the typical mechanism known to date to cause an soft error resulting from environmental radiation, which error is again called SEC (Single Event Upset).

There are cases where such SEU occurs for the memory circuit or for the logic circuit of the memory device.

As for the SEU of the memory device, the case where a plurality of cells cause an error at the same time is called MCU (Multi Cell Upset), which is distinguished from SBU (Single Bit Upset). The SBU and the common MCU are repairable by ECC (Error Correction Code), but when an MBU (Multi Bit Upset) included in the MCU happens in which an error happens within the same word, it is not repairable by the conventional ECC, so that it causes the system down.

In recent years, according as the semiconductor devices are further miniaturized, keen attention has been paid to the problem with the SEU happened for the logic circuit. The noise (SET: Single Event Transient) resulting from environmental radiation and happening at the logic gate causes an inversion of an FF (Flip-Flop) so as to bring, about a malfunction of the logic circuit. An SET happened at a combinational logic circuit comprising AND-OR-Inverter and having no memory device turns out to be an SEU when it propagates within the circuit and is latched (data retention) by an FF and as such. A redundancy code can not be added to the logic circuit, so that a soft error happening for the logic circuit is not reparable by the ECC and as such. Thus, it requires a method other than the ECC to prevent a soft error from happening on the logic circuit.

As one of the prior art references on the method for estimating a soft error rate (SER) of the logic circuit and improving thereon at the stage of designing the circuit, there is disclosure in the abstract of Patent Document 1 (International Publication No. 2007-034548) saying 'a CAD apparatus comprising a means for specifying a signal transfer delay time of the respective signal transfer circuits of the LSI circuit; a means for specifying an output inversion rate of a flip-flop circuit of the respective signal transfer circuits when the former is exposed to radiation; a means for specifying the signal transfer circuit resulting in a critical path; a means for computing a soft error rate of the LSI circuit as a whole based on the signal transfer delay time, the output inversion rate and a clock period; and a means for lowering the soft error rate of the LSI circuit as a whole such that the signal transfer delay time of the signal transfer circuit resulting in the critical path does not change when the predetermined soft error rate is lower than the soft error rate of the LSI circuit as a whole'.

Differently from a hard error (permanent failure of a hardware), the soft error including an SEU is faced with such a problem as making it hard to specify a factor of such error owing to the fact that data is afresh renewed after the occurrence of such error and the software returns to the normal operation through restart. This means that the influences that the soft error gives on the logic circuit cause malfunctions of the processors, ASICs, digital control circuits of a computer, so that it is apprehended that they turn out to be factors causing malfunctions of the electronic system.

Conventionally, as one example of performing the system performance evaluation and verification, there is disclosure on a discrete events simulation in which the queuing theory is applied in Nonpatent Document 1 (International Publication No. 2007-034548) (Development of a Simulator for the Network Type Queuing Theory System), which simulator is characterized in comprising the steps of inputting i) the number of windows and the disposition of the windows, ii) network structure, iii) branching probability, iv) probability distribution as discrete events models and performing simulation on the given models so as to detect bottlenecks; outputting a change in the number of people within the system, a chronograph of the number of people within the system so as to facilitate various types of network type queuing theory models to be constructed.

Further, in Nonpatent Document 2 (A technique for Estimating the Number of Soft Errors of the Computer System with the Operation of the Program Taken into Account), with the proposals of the model by which the number of soft errors of the computer system comprising a CPU, a cache memory and a main memory and the estimation algorism of the simulation basis, there is disclosure that as the result of experiments, the smaller the number of soft errors affecting the system operation becomes, the larger the cache size becomes; the larger the cache size becomes, the more the SERs of the cache module increases while the smaller the number of soft errors happening during the execution of the program becomes; and the number of soft errors is largely controlled by the types of the application programs.

CITATION LIST

Patent Literature

Patent Document 1: International Publication No. 2007-034548.

Nonpatent Literature

Nonpatent Document 1: 'Development of a Simulator for the Network Type Queuing Theory System' written by Hiromi TANAKA (Business Management Master Course of Senshu University), JST Document No.: L5805A ISSN: 0286-6048 on Information Science Research Compiled by Information Science Institute at Senshu University, No. 27, pp. 15 to 31, published on Mar. 1, 2007, see FIG. 15, Table 2 and Reference 20.

Nonpatent Document 2: A Simulation-based Soft Error Estimation Methodology for Computer Systems, Sugihara, Makoto/Ishihara, Tohru/Hashimoto, Koji/Muroyama, Masanori, International Symposium on Computer Quality Electronic Design, Proc. of International Symposium on Quality Electronic Design, pp. 196 to 203.

SUMMARY OF INVENTION

Technical Problem

In accordance with the trend that the semiconductor devices are miniaturized and highly integrated, the influences that the soft errors resulting from environmental radiation ($\alpha$ rays, neutron beams and as such) give on such devices prevail, so that the number of soft errors happening on not only a memory device, but also a logic circuit acutely increases. Thus, such errors happening on systematic products are going to be problematic sooner or later.

However, on account that it is hard to shield such products from neutron beams that are the main factors of such soft errors, provided that the SER of the delivered product is higher, it faces the difficulty with which such errors are reduced. It is further difficult to make the whole components comprising such product free from such errors. In turn, choosing a product whose SER is lower leads to the difficulty with which the functions of such product are realized or its performance as desired being hard to achieve.

Thus, the present invention is to provide a simulation apparatus for aiding computing an optimum value between the soft error rate and the processing performance of a systematic product and the same method.

Solution to Problem

Briefly commenting on the best mode for carrying out the present invention disclosed herein, it is as follows.

(1) There is provided a simulation apparatus comprising: a discrete events simulation section to perform a discrete events simulation of components of a configured model as defined based on attribute information that is information on parts of the components of the defined configured model and connection information showing a connectional relationship among the components of the defined configured model; and a soft error rate computation processing section to compute a soft error rate of the defined configured model based on a simulation result of the discrete events simulation section and data on soft error rates in the attribute information.

(2) There is provided a simulation method comprising: a step of inputting a configured model as defined; a step of performing a discrete events simulation to do a discrete type simulation of components of the defined configured model based on attribute information that is information on parts of the components of the defined configured model inputted at the inputting step and connection information showing a connectional relationship among the components of the defined configured model; and a step of performing a soft error rate computation processing to compute a soft error rate of the defined configured model based on a simulation result of the discrete events simulation step and data on soft error rates in the attribute information.

Advantageous Effects of Invention

The present invention provides a simulation apparatus for aiding computing an optimum value between the soft error rate and the processing performance of an electronically systematic product as well as the same method and program.

BRIEF DESCRIPTION OF DRAWINGS

FIG. 5 shows one example of GUI when the configured model of the simulation apparatus according to the invention is established;

DESCRIPTION OF EMBODIMENTS

The simulation apparatus according to the invention to compute a rate of soft errors resulting from environmental radiation and the same method are explained below with reference to FIGS. 1 to 12.

As the preface of explaining the preferred embodiments of the invention, the inventors have found that there is correlation as to the configured system including memory circuits and logic circuits between a processing performance corresponding to a processing speed and a soft error rate. In recent years, it has been known that environmental radiation (such as neutrons) badly affect servers, routers, the signal controlling system of the railways and as such. There are cases where such error rates of those configured systems might be lowered by modifying the system configuration in the aspects of both hard and soft fields, but it results in badly affecting the processing performances of those systems.

The invention provides a simulation apparatus and the same method with both a processing performance and a soft error rate taken into account by performing a discrete type simulation on a configured system as defined in an arbitrary manner and computing the processing performance of the configured system as well as computing a soft error rate of the defined configured system employing the discrete type simulation result.

Figure 1:
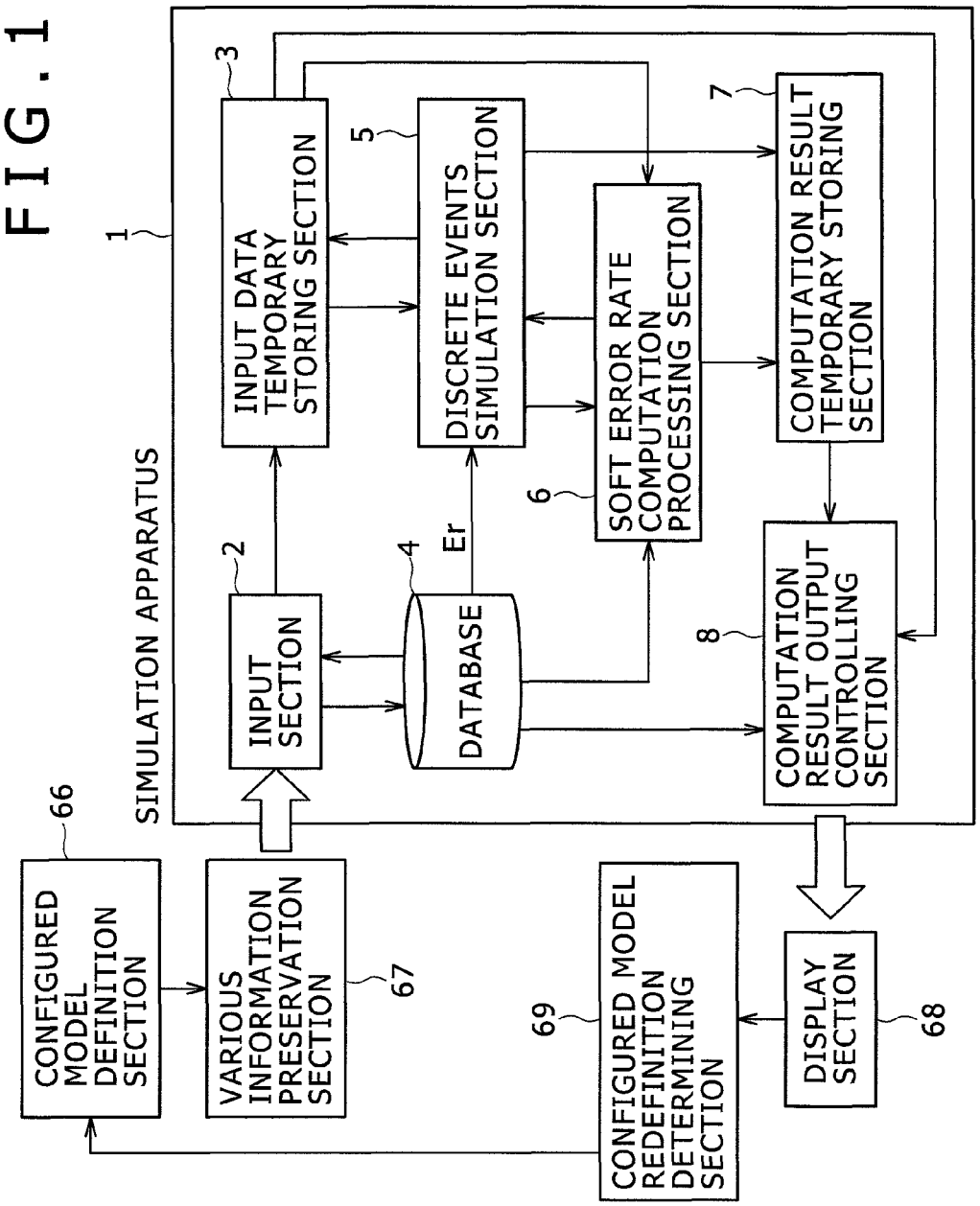
FIG. 1 is an explanatory view showing the first embodiment of the simulation apparatus according to the invention.

FIG. 1 is a view showing the configuration of the simulation apparatus according to the invention to compute a rate of soft errors resulting from environmental radiation. The simulation apparatus 1 shown in FIG. 1 comprises an input section 2, an input data temporary, storing section 3, a database 4, a discrete events simulation section 5, a soft error rate computation processing section 6, a computation result temporary storing section 7 and a computation result output controlling section 8 and so forth.

The input section 2 receives from an exterior (e.g. from a various information preserving section 67) of the simulation apparatus 1 various information such as the configuration of s system subjected to the simulation (hereinafter, referred to as 'configured model'), parameters for various computations used for the simulation computation (hereinafter, referred to as 'discrete events parameters') and information on the discrete events parameters of the respective components of the configured model.

Figure 3:
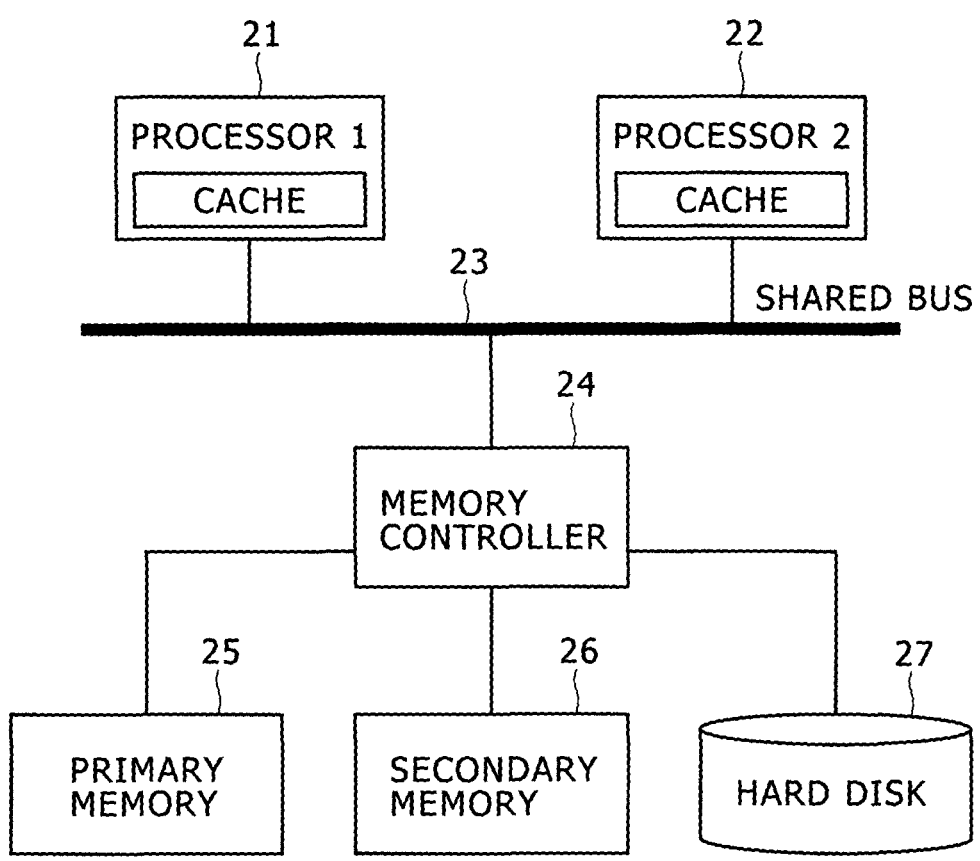
FIG. 3 is a view showing one example of the system configuration that is a configured model subjected to the simulation by the simulation apparatus according to the invention.

Hereupon, the configured model denotes a system configuration on which simulation is performed by the simulation apparatus 1 and whose configuration is accordingly determined. For example, a model in which the respective components such as processors 21 and 22, a memory controller 24, a primary memory 25 and so forth are interconnected as shown in FIG. 3 is called a configured model. Further, the respective components such as processors 21 and 22, a memory controller 24, a primary memory 25 and so forth are called components of the configured model. This configured model is defined at the configured model definition section 66, for example that is outside of the simulation apparatus 1.

The discrete events parameters denote those for various computations used for the simulation computation executed in the simulation apparatus 1 and include an arrival interval of events, a generation interval of events, a service time, a queue type, a queue size, a switch, a terminal and as such in the queuing theory, by way of some examples.

The various information denote, in addition to the discrete events parameters, SERs, attribute information including information on the parts of the components such as SERs, power consumption, parts sizes, circuit scales as well as the direction information that is the connectional information among the respective components.

The input section 2 transmits the defined configured model and various information and so forth as received from the exterior (from the various information preserving section 67) of the simulation apparatus 1 to the input data temporary storing section 3.

Further, the attribute information is preserved in the database 4, but when the SERs of the components of the configured model inputted into the input section 2 are not defined in the preserved attribute information, the SERs of the components of such configured model are transmitted from the input section 2 to the database 4.

The database 4, as mentioned above, stores attribute information on the respective components of the configured model and receives SERs from the input section 2 where necessary so as to add information on such SERs to the attribute information thereof. Then, the database transmits attribute information Er corresponding to the components of the defined configured model to the discrete events simulation section 5.

The input data temporary storing section 3 preserves various information inputted from the input section 2 and transmits the direction information that is the connectional information among the respective components of the defined configured model to the discrete events simulation section 5.

The discrete events simulation section 5, based on the attribute information Er received from the database 4 and the direction information received from the input data temporary storing section 3, performs a discrete events computation based on the queuing theory. The discrete events simulation section 5 computes an average queue use rate, a service stay time and so forth per component of the configured model and transmits the computed result to the soft error rate computation processing section 6. Further, the section 5 transmits a processing performance (processing time) simultaneously computed by the same to the computation result temporary storing section 7.

The soft error rate computation processing section 6, based on an average queue use rate, a service stay time and so forth per component of the configured model received from the discrete events simulation section 5, an SER per component of the configured model received from the database 4 and the direction information (information on the configured model) received from the input data temporary storing section 3, computes a soft error rate of the defined configured model as a whole, that of the respective components and that of the components in combination.

According to the invention, the soft error rates of the respective components of the defined configured model is not simply added, but the soft error rate is computed based on such values as average queue use rates, service stay times and so forth computed at the discrete events simulation section 5, but with the configured model as a whole and the relationship with the processing time of the respective components taken into account. Further, as with the soft error rate, both that of the configured model as a whole comprising the combination of the respective components and that of the respective components of the configured model are computed. Thereafter, the soft error rate computation processing section 6 transmits the computed soft error rates to the computation result temporary storing section 7.

The computation result temporary storing section 7 transmits to the computation result output controlling section 8 the soft error rates received from the soft error rate computation processing section 6 that are computed there with the average queue use rates, service stay times and as such of the defined configured model taken into account as well as the processing performance (the processing time and so forth of the defined configured model as a whole) received from the discrete events simulation section 5.

For the computation result output controlling section 8 to output the simulation result based on the soft error rates and the processing performance received from the computation result temporary storing section 7, the attribute information received from the database 4 and the direction information received from the input data temporary storing section 3, it outputs data (information) to a device and so forth outside of the simulation apparatus 1.

The data transmitted from the computation result output controlling section 8 is displayed on GUI (display section 68), for instance and whether or not the same satisfies a soft error rate as desired is determined at the configured model redefinition determining section 69. If in the affirmative, the system design completes with the defined configured model whereas if in the negative after the configured model is redefined, the redefined configured model is again inputted into the input section 2 of the simulation apparatus 1 for further similar simulation.

FIG. 1 shows the output from the configured model redefinition determining section 69 inputted into the configured model definition section 66, but it may well be inputted directly into the input section 2 or into the various information preserving section 67.

In this way, until the soft error rate computed at the soft error rate computation processing section 6 satisfies a requirement, the definitions of the configured model and simulations are repeated so as to result in determining the configured model satisfying such requirement.

One of the characteristic features of the invention lies in that the soft error rate is computed based on such values as average queue use rates, service stay times and so forth computed at the discrete events simulation section 5, but with the configured model as a whole and the relationship with the processing time of the respective components taken into account. This allows a system design higher in a soft error resistance for circuits (especially, logic circuits) to be realized.

For instance, as disclosed in the Nonpatent Document 2 saying 'the soft error rate computed by simply adding the soft error rates of the hardware components such as a cache memory, a register and as such often results in being a pessimistic value', the soft error rate computed by simply adding the soft error rates of the respective components results in largely differentiating from that obtained when the configured model as a whole is taken into account. Employing the average queue use rates, the service stay times and as such of the configured model with the processing time of the respective components taken into account according to the invention permits a soft error rate to be probabilistically computed. This allows s system design to be more precisely performed through the simulation of the soft error rates so as to realize a system design higher in a soft error resistance for circuits (especially, for logic circuits).

Hereupon, the inputting device for the input section 2 is not limited to a specific device or type, but may well be a keyboard, a touch panel and as such used for general computers. Further, the destination of the data outputted from the computation result output controlling section 8 is not limited to a specific device or type, but may well be a displaying device such as a display used for general computers, another simulation apparatus and the like.

Figure 13:
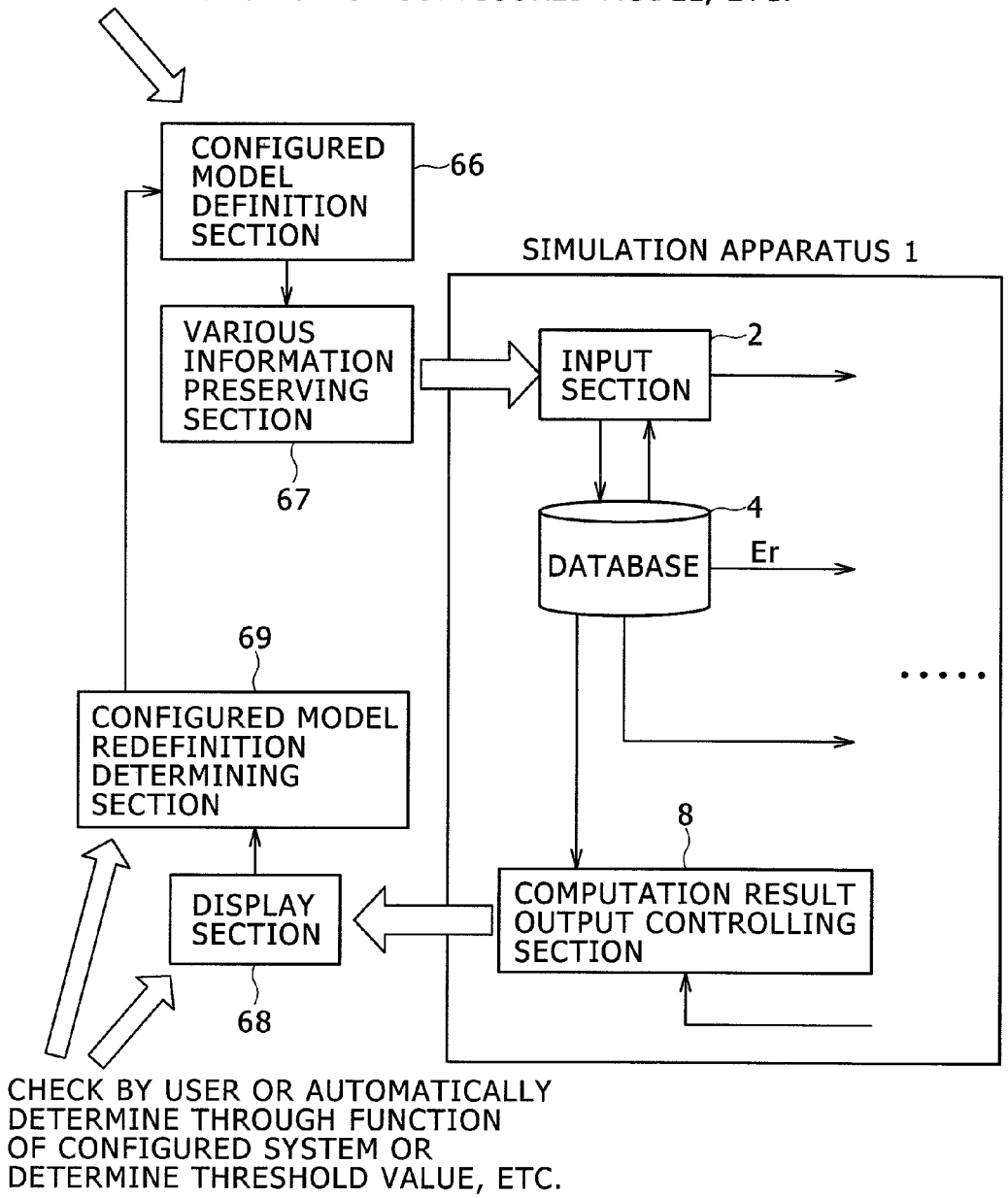
FIG. 13 is a detailed explanatory view showing the input/output sections of the simulation apparatus shown in FIG. 1.
Figure 14:
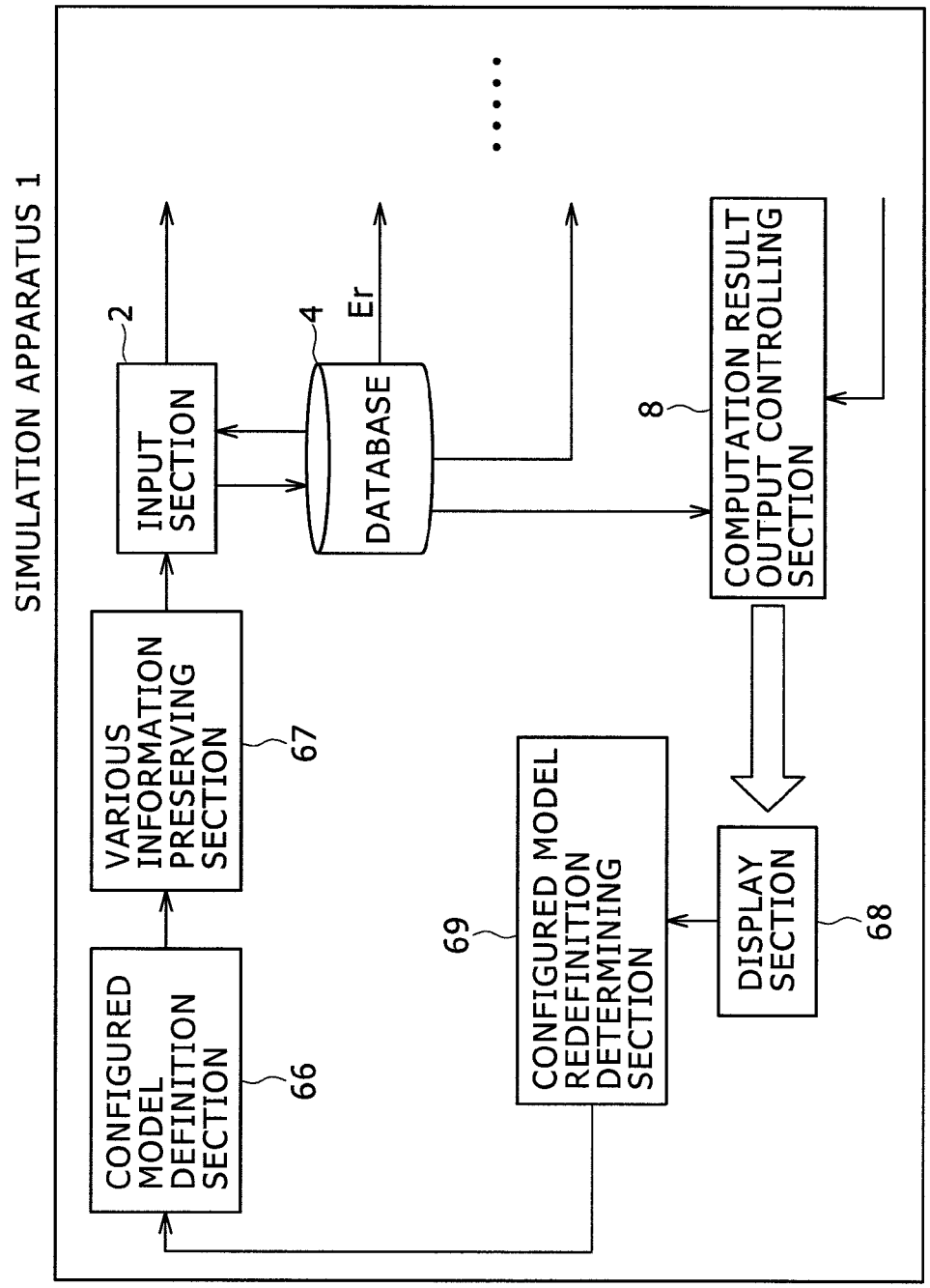
FIG. 14 is a detailed explanatory view showing the input/output sections of the simulation apparatus shown in FIG. 1.
Figure 15:
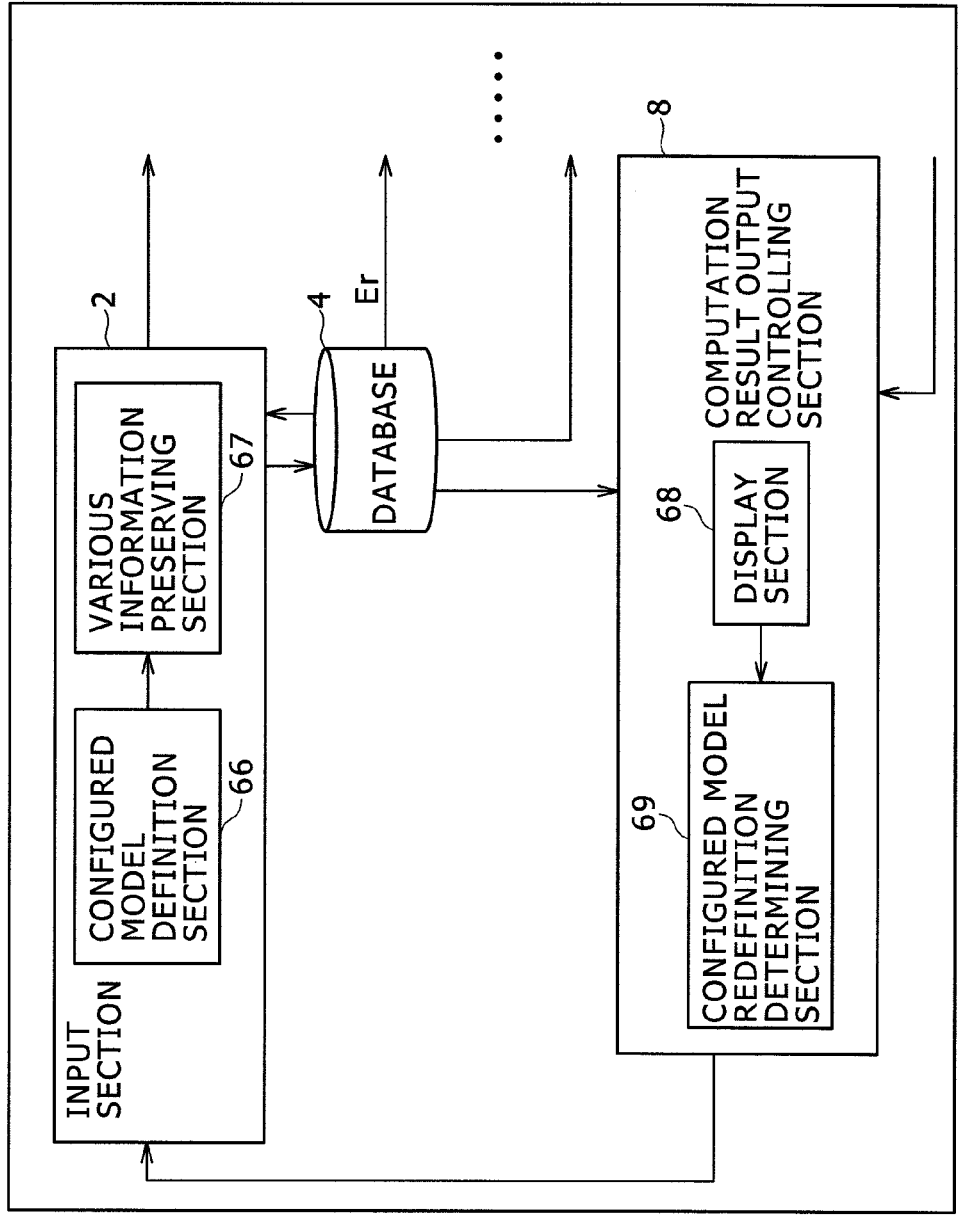
FIG. 15 is a detailed explanatory view showing the input/output sections of the simulation apparatus shown in FIG. 1.

FIGS. 13 to 15 are explanatory views showing the configuration of the inputting device used when the defined configured model, various information and so forth are transmitted to the input section 2 of the simulation apparatus 1 and that of the display section (outputting device) to display the simulation result such as the soft error rates, the processing performance, the attribute information, the direction information and so forth outputted from the computation result output controlling section 8.

At the configured model definition section 66, a configured model is defined based on functions and as such required for the system. Hereupon, it is exemplified that the user determines the components based on the functions and so forth of the device to be designed and defines the connectional relationship among the respective components so as to generate the configured model. The definition of the configured model is not necessarily carried out by the user, but it may well be automatically performed such that the requirements (functions) of the system as a whole set by the user are satisfied.

FIG. 5 shows one example of GUI when the user sets a configured model. For instance, it is contemplated that such GUI is displayed at the configured model definition section 66.

The various information storing section 67 receives information on the configured model defined by the configured model definition section 66 and inputs various information on the defined configured model and the defined configured model into the input section 2 of the simulation apparatus 1. This allows such defined configured model and various information to be given to the simulation apparatus 1.

Hereupon, it is exemplified that the configured model definition section 66 is separately arranged from the various information storing section 67, but they may well be arranged into the same inputting device. Further, in FIGS. 1 and 13, they are shown as external devices outside of the simulation apparatus 1, but may well be incorporated into the simulation apparatus 1 as shown in FIG. 14. Further, as shown in FIG. 15, the input section 2 of the simulation apparatus 1 may well function as both the configured model definition section 66 and the various information storing section 67.

At the display section 68 as shown in FIG. 13, the simulation result outputted from the computation result output controlling section 8 is displayed on GUI, for example. The user who sees the result determines the defined configured model as the system configuration if the same satisfies the predetermined soft error rate viewed from the relationship between the processing performance and the soft error rate whereas if in the negative, a new configured model is redefined based on the functions and so forth as desired to be provided with the system configuration, and the redefined configured model is transmitted to the configured model definition section 66, for instance.

Hereupon, it is not necessarily the user that determines whether or not the configured model is redefined in view of the relationship between the processing performance and the soft error rate shown in the display section 68, the redefinition of the configured model may well be automatically performed based on the predetermined functions and so forth to be provided with the system configuration. Further, a threshold value may well be defined in view of the relationship between the processing performance and the soft error rate of the predefined configured model and whether or not such redefinition is performed may well be determined based on such threshold value.

Further, whether or not such redefinition is required may well be determined at the configured model redefinition determining section 69.

Figure 10:
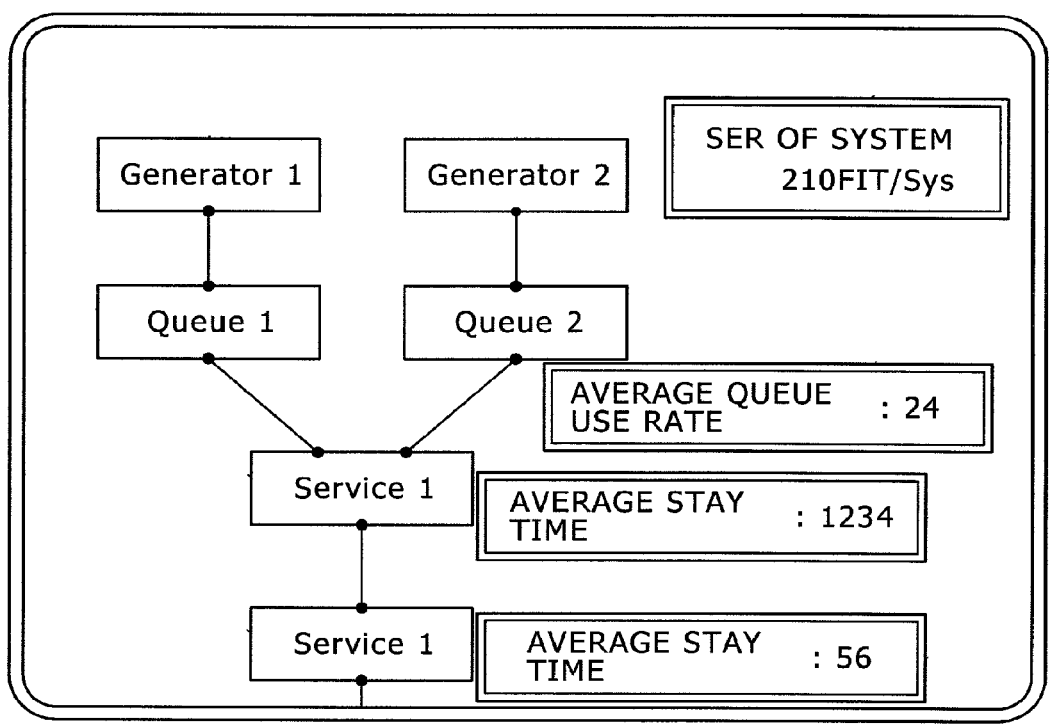
FIG. 10 shows the display (output) of the simulation result by the simulation apparatus according to the invention.

FIG. 10 is a view showing one example of GUI when the user sets a configured model. It is exemplified that such GUI is displayed on the display section 68. The user may determine whether or not the configured model is redefined and the simulation is again performed based on the SER of the system, the average stay times and so forth of the respective components as shown in FIG. 10

Further, when whether or not the redefinition of the configured model is performed is automatically determined, an outputting device on behalf of the display section 68 may well be provided.

Moreover, in FIG. 13, it is shown that the display section 68 is an external device outside of the simulation apparatus 1, but it may well be incorporated into the simulation apparatus 1 as shown in FIG. 14. Further, as shown in FIG. 15, the computation result output controlling section 8 may well function as the display section 68 and the configured model redefinition determining section 69.

Furthermore, when the simulation result does not satisfy the predetermined requirement so that it is determined that the redefinition of the configured model is required, only the parameters such as information on the parts of the respective components may well be modified without the configured model being redefined and with the model itself intact. In this case, the attribute information stored in the database 4 results in being corrected.

When the configured model definition section 66 and the various information preserving section 67 are stored in the same section as shown in FIG. 15, the input section 2 may well be done without.

Further, with reference to FIG. 1, when the data is inputted into the discrete events simulation section 5 directly from the input section 2 or the database 4, the input data temporary storing section 3 may well be done without.

Moreover, with reference to FIG. 1, it is shown that the direction information that is the connectional information of the configured model is preserved in the input data temporary storing section, but it may well be stored in the database 4 in the same way as the other various information and as such. In this case, the input/output of the various information of the configured model is performed only at the database 4, which leads to miniaturizing the apparatus and facilitating the operational steps.

Furthermore, with reference to FIG. 1, the discrete events simulation section 5 and the soft error rate computation processing section 6 may well be disposed in the same processing section.

When the simulation result is transmitted directly from the soft error rate computation processing section 6 to the computation result output controlling section 8, the computation result temporary storing section may well be done without.

Whether or not the configured model is redefined may well be determined within the simulation apparatus 1 as shown in FIG. 14. In this case, the user preliminarily gives threshold values of the processing performance and the SER of the system to the simulation apparatus 1. A determining section to determine whether or not such values are satisfied is disposed in the simulation apparatus 1, e.g. in the computation result temporary storing section 7 or the computation result output controlling section 8 or in the configured model redefinition determining section 69 and so forth separate from those sections, thereby, whether or not the redefinition of the configured model is required being determined by such configured model redefinition determining section 69 and so forth.

As for the method for redefining the configured model, the user may well set the same such that the threshold values defined in view of the relationship between the processing performance and the SER of the system are satisfied as shown in FIG. 13. In turn, the user may well define only the functions required for the system configuration while the configured model satisfying such functions may well be automatically redefined.

One of the characteristic features of the invention lies in that the discrete events of the respective components are subjected to simulation employing the queuing theory, for instance and the SER of the system is probabilistically computed employing the SER based on the average queue use rates, the service stay times and so forth of the configured model as a whole and the respective components thereof so that the simulation apparatus and as such satisfying such feature is encompassed in the technical scope of the invention.

Figure 2:
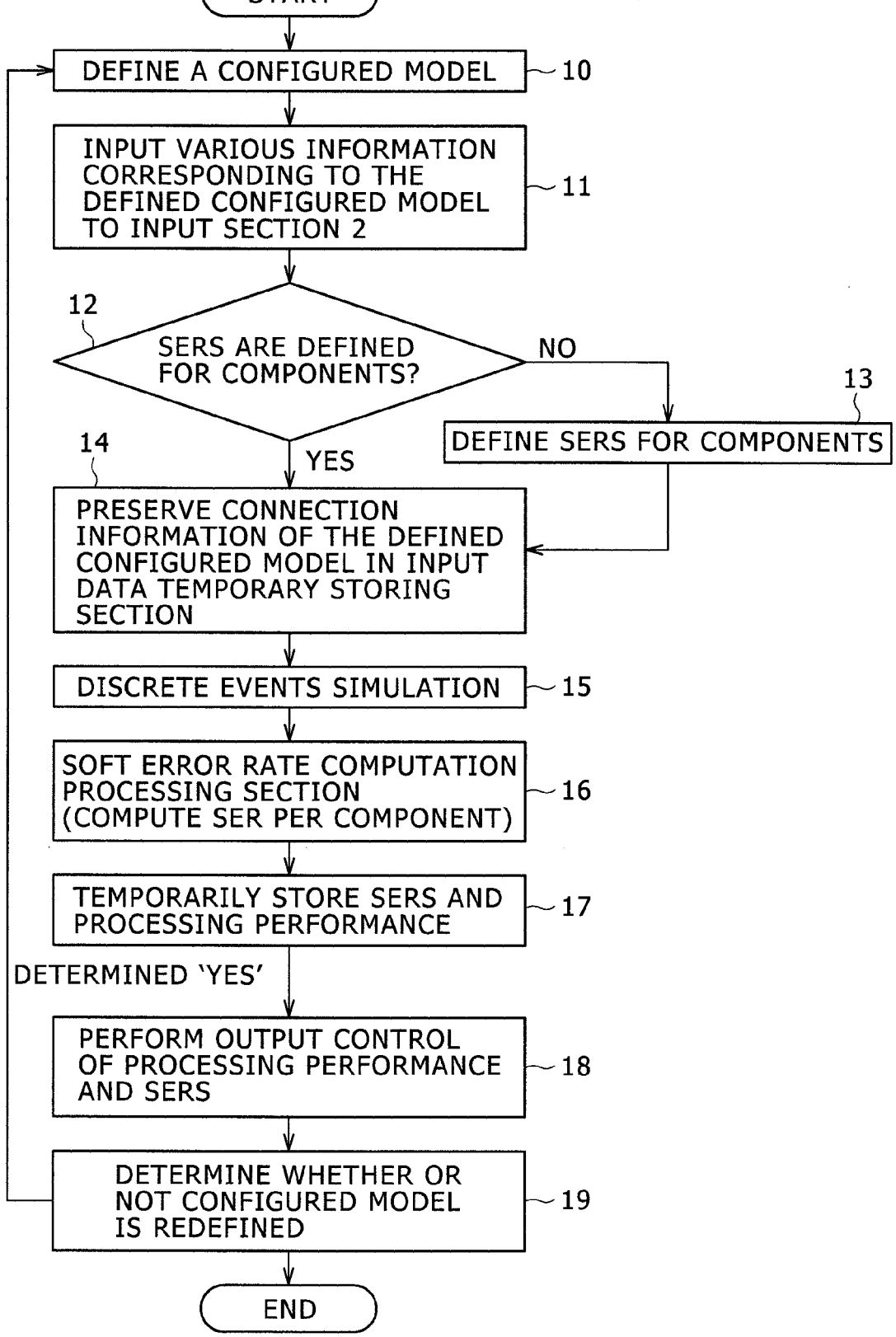
FIG. 2 is an explanatory view showing the first embodiment of the simulation method according to the invention.

FIG. 2 is an explanatory view showing the simulation method according to the invention by which a rate of soft error resulting from environmental radiation is computed.

At Step 10, a configured model is defined. The definition of the configured model is performed at the configured model definition section 66 shown in FIG. 1, for instance, which definition may well be performed either by the user or automatically. For example, the system configuration as desired is defined as a configured model or such model is automatically defined based on the functions as desired. Further, the user inputs only the functions as required for the configured system and a configured model satisfying such functions may well be automatically defined.

At Step 11, various information corresponding to the configured model defined at Step 10 is inputted into the input section 2.

At Step 12, whether or not the SERs corresponding to the components of the defined configured model are preserved in the database 4 shown in FIG. 1 is determined. If in the negative (No), proceeding to Step 13, where information on such SERs is read from among various information inputted in the input section 2 so as to be transmitted to the database 18.

If the SERs are defined (Yes) or after the information on such SERs is transmitted though the SERs are not defined, at Step 14, the connectional information among the respective components of the defined configured model is transmitted to the input data temporary storing section 3 shown in FIG. 1.

At Step 15, based on the attribute information on the defined configured model received from the database 4 shown in FIG. 1 and the direction information on the defined configured model received from the input data temporary storing section 3, the discrete events simulation is performed.

At Step 16, based on information on the average queue use rates, service stay times and so forth of the configured model resulted from the discrete events simulation and the direction information obtained from the input data temporary storing section 3, the soft error rate of the defined configured model is computed.

Then, at Step 17, the soft error rate computed at the soft error rate computation processing section 6 and the processing performance computed at the discrete events simulation section 5 are stored in the computation result temporary storing section 7.

Subsequently, at Step 18, output control is performed on the SER and the processing performance stored at Step 17 so as to display the same on e.g. the display section outside of the simulation apparatus 1.

At Step 19, based on the outputted result through output control at Step 18, whether or not the redefinition of the configured model is required is determined. This may well be determined by the user who sees the outputted result or may well be automatically determined. In turn, the user may well predetermine the functions as required and a configured model may well be automatically set such that such functions are satisfied. Alternatively, whether or not such redefinition is required may well be determined in comparison with the threshold values predetermined by the user in view of the relationship between the processing performance and the SER based on the functions as required by the user.

As the result of Step 19, if it is determined 'Yes', returning to Step 10 in which the configured model is redefined, for instance. At Step 10, if it is determined 'Yes', the configured model itself does not have to be redefined, but only the parameters such as information on the parts of the respective components may well be modified with the same configured model intact for executing the simulation again. In turn, the configured model, the discrete events parameters and the simulation method may well be altered, and the simulation may well be repeated until the processing performance and the SER of the system subjected thereto reach targeted specifications. To note, an optimal solution may be found with the tendencies of the computation results statistically processed. Further, the processing arrangement of the invention may be also realized as a program carried on a general computer comprising processors, a memory, a hard disk, a keyboard, a display and as such.

As the result of Step 19, if it is determined 'No', the configured system completes with the defined configured model, so that the simulation ends.

FIG. 3 is a view showing one example of the system configuration that is the configured model subjected to the simulation by the simulation apparatus according to the invention. In this example, the arrangement of a general computer or a control device is shown in which processors 1 (21), 2 (22) and a memory controller 24 are connected with a shared bus 23 while the memory controller 24 is connected to a primary memory 25, a secondary memory 26 and a hard disk 27. In this example, two processors are connected with one shared bus and there are provided four memory devices or the cache, the primary and the second memories and the hard disk, in which a cache hit rate, an operating ratio of the shared bus 23 and use rates of the respective memory devices determine the processing performance of the system. The arrangement of the configured model is not limited to that shown in FIG. 3, but may well include components of different types and the combination of such components may well be selected in an arbitrary manner.

Figure 4:
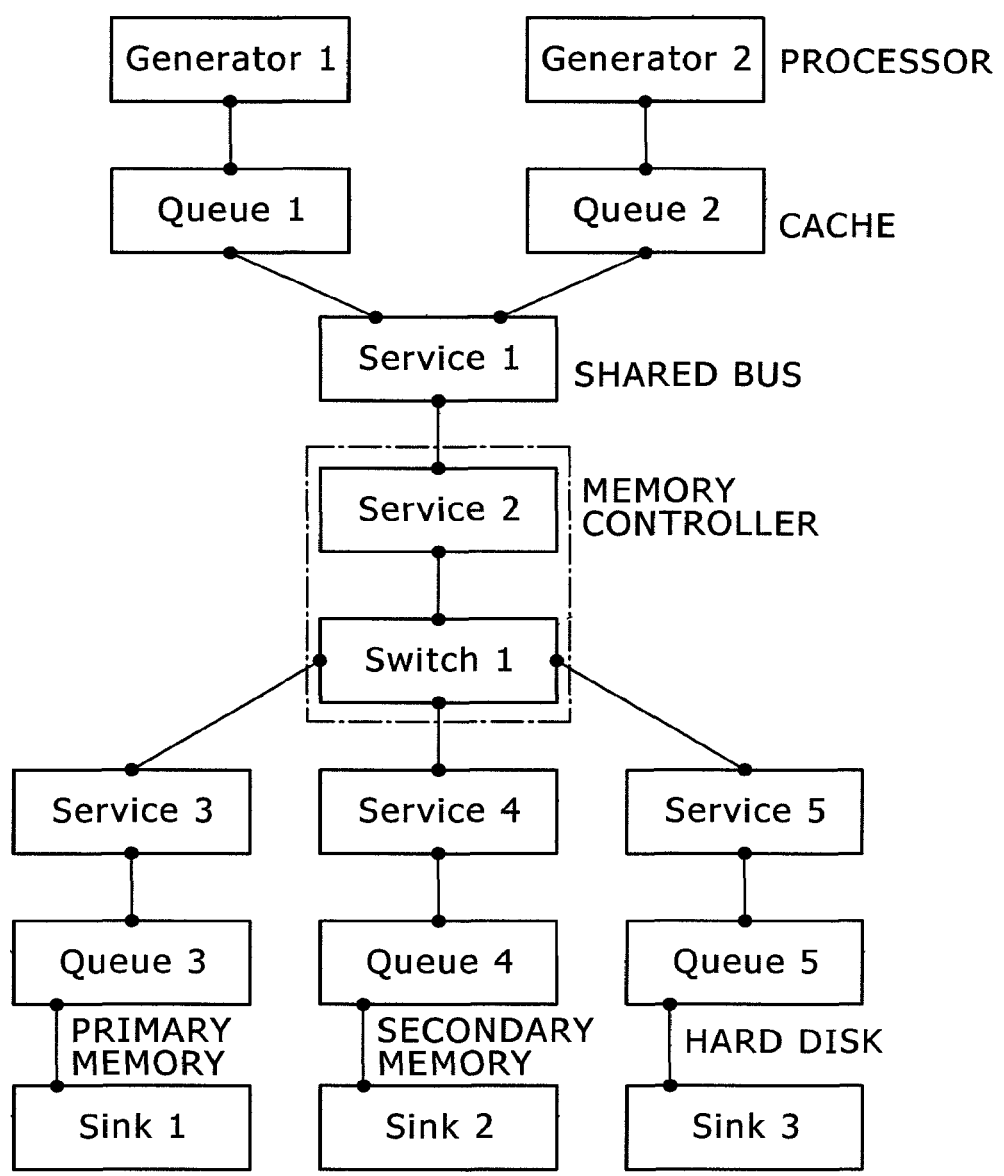
FIG. 4 shows the example of the system configuration defined in FIG. 3 defined employing the configured model according to the invention (the example represented with the discrete events model)

FIG. 4 shows an example of the system configuration defined in FIG. 3 defined employing the configured model according to the invention. The processor is defined as 'Generator'; the cache, the primary and secondary memories and the hard disk being defined as 'Queue' as the memory sections as well as 'Service' denoting their control processing time. Further, such components with a processing time as the shared bus and the memory controller are defined likewise as 'Service'. Adding the connectional information to associate those components with one another in the same way as the connectional relationship of the system subjected to the simulation allows the processing configuration of such system to be rendered into a model. This configured model allows an event generated from 'Generator' with a desired probability to be delivered among the connected components so as to be stored in 'Queue' and outputted to 'Sink' after a certain service time (processing time), with the result that an event living time is counted. Based on such event living time, the performance of the configured model is computed. Further, the bottleneck of the system subjected to the simulation can be observed based on the average stay time of such event and the average use rate of 'Queue' at the respective 'Service' elements.

FIG. 5 shows one example of GUI when the configured model is established. It is exemplified that such GUI screen is shown at the configured model definition section 66 shown in FIG. 1

Hereupon, an example in which the definition of the configured model and the discrete events parameters as well as the SER definition are inputted is shown. In a general computer, the display example shown in FIG. 5 is outputted on the display and the definition of the configured model, the discrete events parameters and the like are inputted through the keyboard. The examples of the inputted discrete events parameters include an arrival interval of events, a generation interval of events, a service time, a queue type, a queue size, a switch and a terminal. Besides, there are some cases where other parameters required for the discrete events simulation might be inputted therein.

Further, such information on the parts of the components as an SER, power consumption, a parts size, a circuit scale may be inputted therein. As for the arrival interval and the generation interval, they are realized with probability distribution calculation formula, the method for generating events from the result stored in the table or that for generating them with an interval employing random numbers and so forth. The probability distribution calculation formula and the result stored in the table and as such may well be stored in the database 4 or the input data temporary storing section 3 shown in FIG. 1.

The processing time and the stay time may be defined as the service time, and various storing methods such as FIFO, LIFO and Stack as well as sizes may be defined as Queue. As Switch, it can accommodate various network configurations such as the star-type and the ring-type by variably defining the number of inputs and that of outputs.

Figure 6:
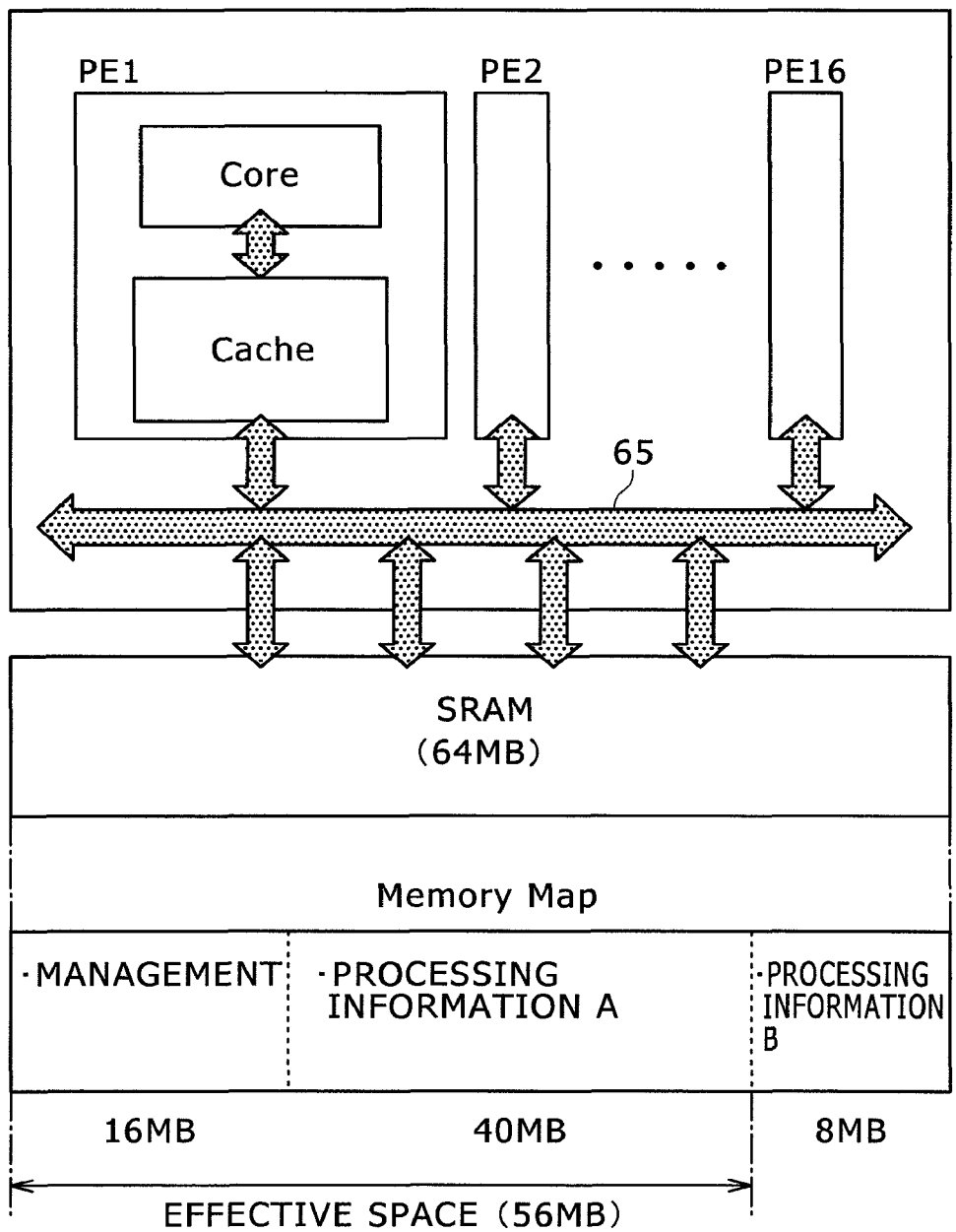
FIG. 6 is a view showing one example (a single SRAM) of other configured models subjected to the simulation by the simulation apparatus according to the invention.
Figure 7:
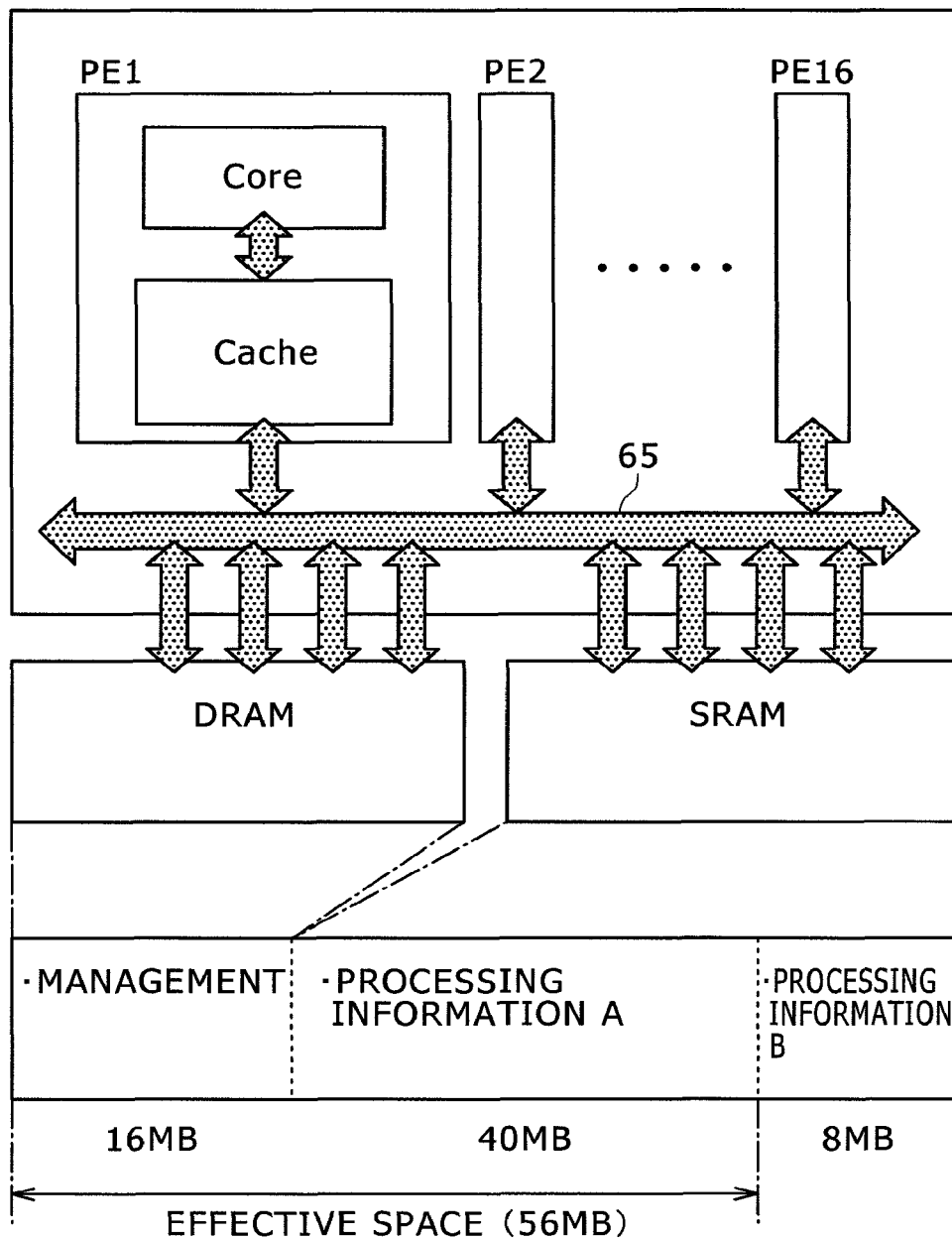
FIG. 7 is a view showing one example (configured with SRAM and DRAM) of other configured models subjected to the simulation by the simulation apparatus according to the invention.

FIGS. 6 and 7 are views respectively showing one example of other configured models subjected to the simulation by the simulation apparatus according to the invention. This example in FIG. 6 shows the shared memory model in which sixteen processors (PE: Processor Element) are connected to an SRAM through the bus 65. FIG. 7 shows an example of the memory model similar to that shown in FIG. 6, which memory connected to the bus 65 comprises a DRAM and an SRAM in concurrent use and which memory map allocation is arranged such that management information is allotted to the DRAM while the other information is allotted to the SRAM. An SER differs according to the types of the parts, in which a DRAM retaining values through a capacitor is generally better by two or three digits at a soft error rate than an SRAM. In the example shown in FIG. 7, the SER of the system as a whole is reduced by concurrently using a DRAM good at SER. Exemplifying the Configuration B shown in FIG. 7 and that A comprising a single SRAM shown in FIG. 6, the relationship between the processing performance and the SER is explained with reference to FIG. 8

Figure 8:
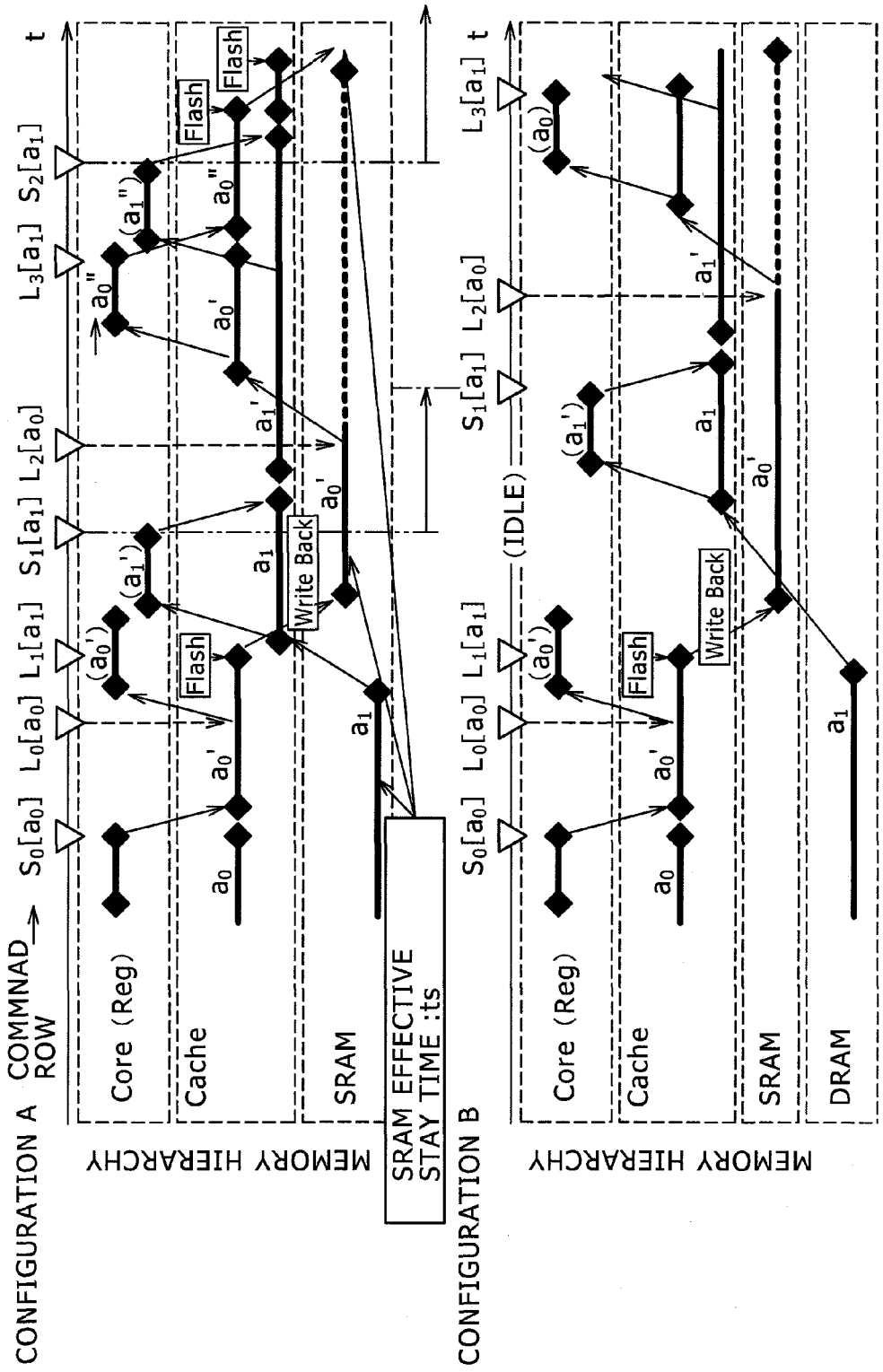
FIG. 8 is a view showing the relationship between the processing performance and SER.

In the upper illustration (Configuration A) of FIG. 8, a memory configuration is allotted in the vertical axis while passage of time (t) is allotted in the horizontal axis. At the Configuration A, upon 'S$_0$[a$_0$]' expressing a first (Positional number 0) store instruction (Address 0:a$_0$) being issued, the data existing in Core is transferred to Cache, which data is again read into Core with a load instruction L$_0$[a$_0$]. After the data is read into Core, it is transferred to the SRAM by flashing the Cache. In this example, the Write-Back method by which the data is written back upon the Cache being flashed is shown. After the data is read into the Core as mentioned above, a1 data is further read from the SRAM into the Core through an instruction L$_1$[a$_1$]. After the a1 data is processed at the Core, it is written back as a$_1$' data to the Cache. Hereafter, in the same way as mentioned above, the processing continues in the order of the instruction row. An example in which the same instruction row as the Configuration A is executed at that B is shown in the lower illustration of FIG. 8. At the Configuration B, a$_1$ data is stored in a DRAM. Generally speaking, it is more often that a DRAM is larger in access latency than an SRAM, so that in this example, it is illustrated on the assumption that the former is to the order of twice as large in access latency as the latter. When the a$_1$ data is loaded in this example, because the DRAM is larger in access latency, the processing at the Core results in an idling state (refer to the section in the illustration indicated with 'IDLE'), so that it is supposed that the processing performance deteriorates. In short, using the DRAM allows the data stay time in the SRAM more vulnerable to environmental radiation than the former to reduce, with the result that the SER of the system as a whole can be lowered while the processing performance deteriorates.

As another example other than that in which the SER is changed by the above-mentioned memory configuration, there is a method by which the frequency of writing into the SRAM is increased by modifying the application program executed at the Core (the instruction row changing). The larger the frequency of read/write into the SRAM becomes, the shorter the stay time at the SRAM becomes, so that the frequency with which data is rewritten in error by environmental radiation lowers, with the result that the SER of the system lowers. Further, regularly performing rewriting operation (referred to as 'scrubbing operation') from the memory parts lower in SER to those higher therein permits to lower the SER of the system. For example, at the Configuration B, when the PEs are in an idling state and the bus is empty, adopting the method by which management information is regularly copied from the DRAM to the SRAM and the SRAM is read upon the management information being accessed from the PEs allows the access time to be made shorter and the data stay time at the SRAM to be reduced, with the result that the SER also lowers. As with those modifications, the processing performance of the system is controlled by the application program and the operations of the respective components such as the frequency with which the bus becomes emptied, the access time of memory parts and so forth, so that such performance is subjected to the discrete events simulation computation and the SER is computed based on the simulation result, thereby, allowing the system to be optimized by the modifications of its configuration and application program.

Figure 9:
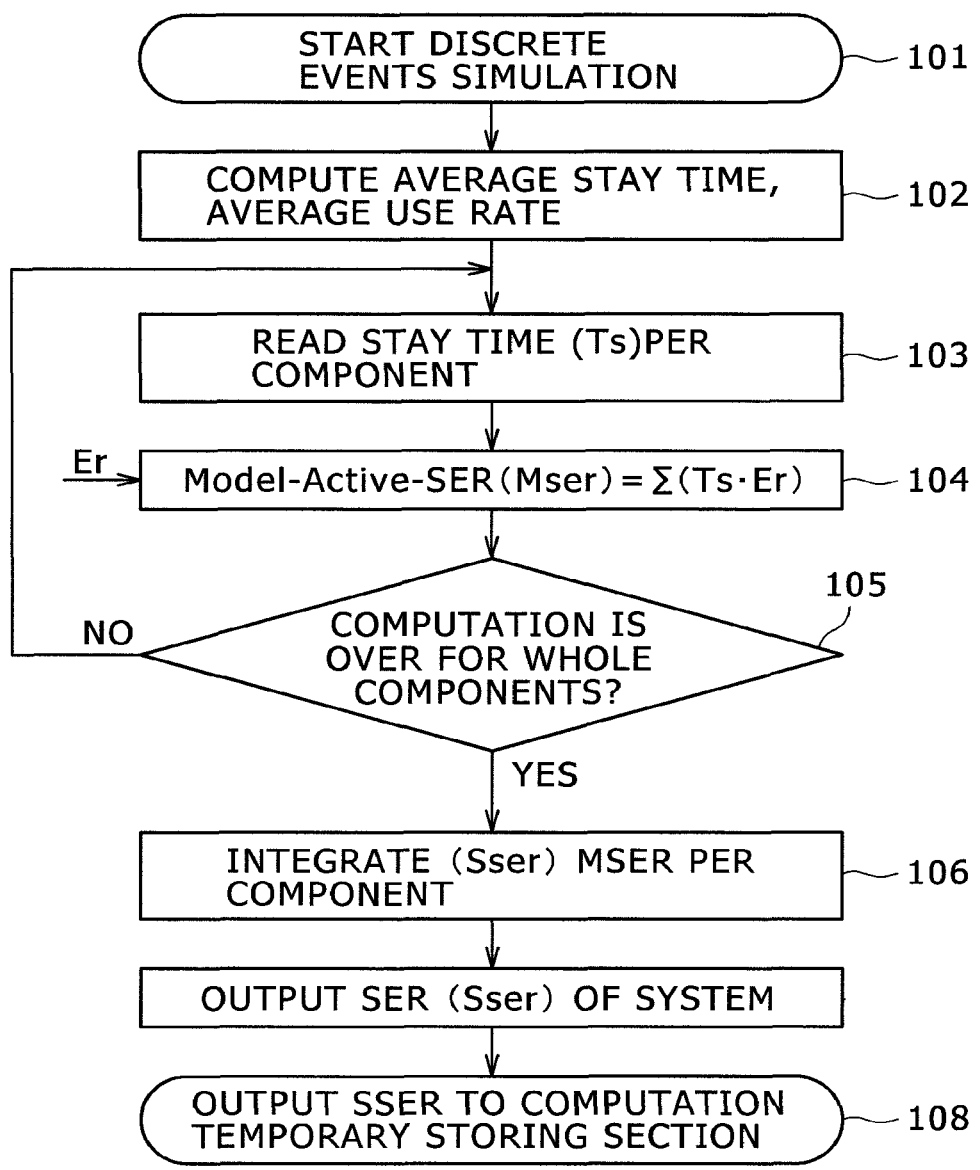
FIG. 9 is a view showing one example of the soft error rate computation processing section of the simulation apparatus according to the invention.

FIG. 9 is a view showing one example of the soft error rate computation processing section of the simulation apparatus according to the invention.

In the first place, the discrete events simulation starts (at Step 101). At the discrete events simulation section 5, the average stay time and queue use rate of the service are computed (at Step 102). From the result at Step 102, the stay time (Ts) per component of the configured model is read (at Step 103), and the computation at Step 104 is sequentially performed.

At Step 104, the SER (indicated with 'Er') per component is read from the database 4 shown in FIG. 1 and the soft error rate of the configured model as a whole is computed by the equation at Step 104. This soft error rate is not the result of simply adding the soft error rates of the components, but is obtained with the stay time per component taken into account.

Whether or not the computation at Step 104 has been performed for the whole components is determined (at Step 105). When there are some components not subjected to such computation, the processing returns to Step 103 for performing such computation for the non-computed components so as to perform such computation for the whole components. After such computation for the whole components has been completed, the SERs of the respective components resulting from the computation at Step 104 are integrated (at Step 106).

The system SER (Sser) resulting from the integration at Step 106 of the system as a whole subjected to the simulation or a part thereof is computed and outputted to the computation result temporary storing section 7 (at Step 108).

FIG. 10 is a view showing one example of the simulation result displayed on the display section 68 shown in FIG. 1, for instance. The information displayed thereon includes an SER per component, power consumption, a parts size, a circuit scale, an SER of the simulation result and a processing performance in addition to an arrival interval of events, a generation interval of events, a service time, a queue type, a queue size, a switch and a terminal. The method for displaying such information is not limited to numeric values, but may well be a statistically processed result, a graph or a table.

Figure 11:
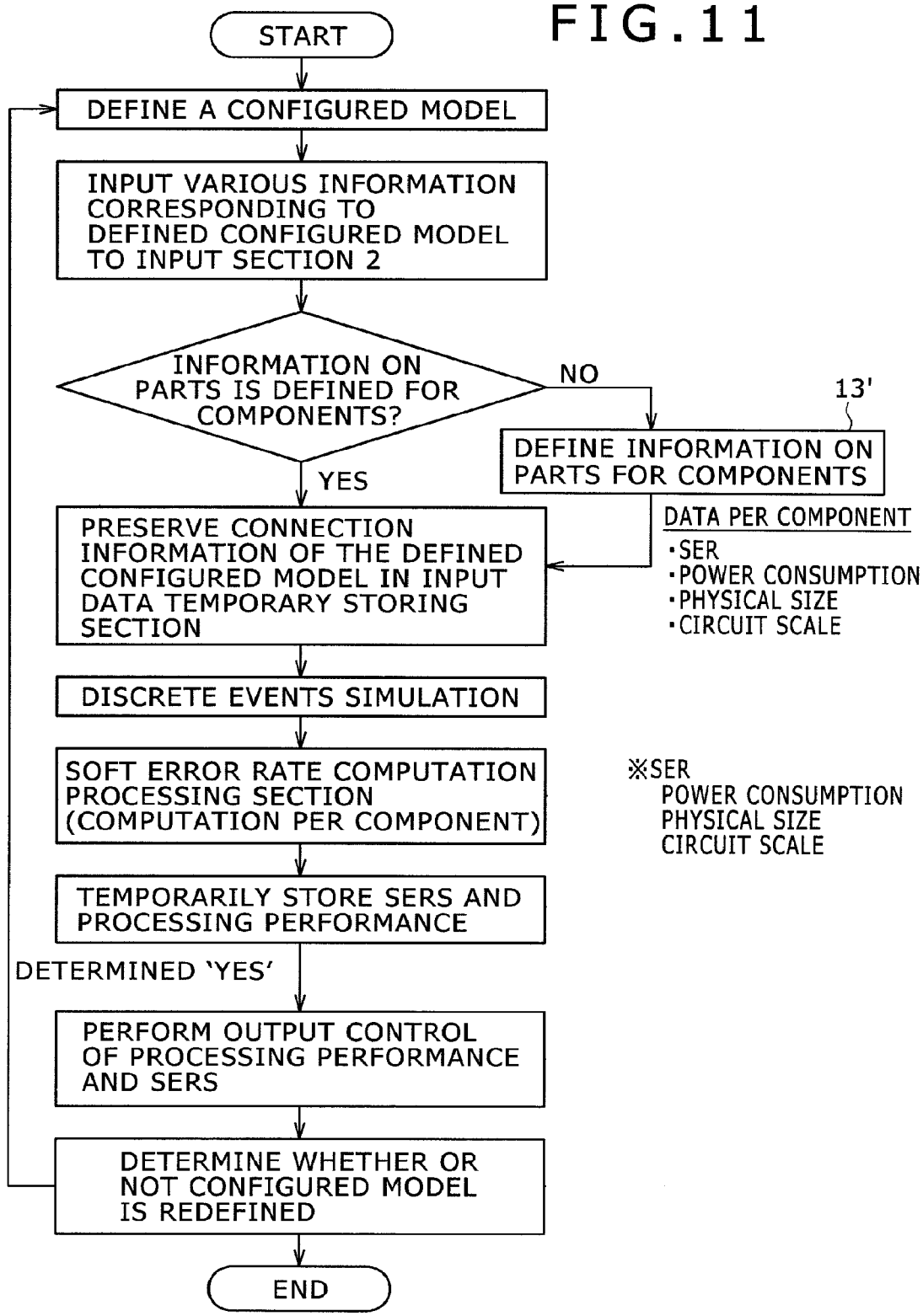
FIG. 11 is an explanatory view showing the second embodiment of the simulation method according to the invention.

FIG. 11 is a view showing one example of the processing flow of the simulation apparatus and the same program to compute not only an SER, but also power consumption, a physical size, a circuit scale and a processing performance. The difference between FIG. 11 and FIG. 2 lies in that at Step 12 of the former whether not an SER, but information on the parts of the components of the defined configured model is preserved or not in the database 4 is determined. If such information is not preserved therein, it results in being preserved at Step 13'.

To note, the configuration of the simulation apparatus is the same as that shown in FIG. 1. When the power consumption, the physical size, the circuit scale and the processing performance are computed, their processing flow is the same as that for the SER. For instance, the relationship between the power consumption and the processing performance is as follows, in which in the case of the system provided with processors the processing performance is expressed with the following equation.

$$\text{Performance} = \text{Operating Frequency} \times \text{IPC} \qquad \text{(Equation 1)}$$

Further, the relationship between the power consumption and the operating frequency is as follows.

$$\text{Power consumption} \approx Cd \times \text{Voltage} \times \text{Voltage} \times \text{Operating Frequency} \qquad \text{(Equation 2)}$$

In view of Equation 1, in order to improve on the performance of the processors, there are methods to improve on the operating frequency as well as to increase IPC (Instruction Per Cycle or the number of execution instructions per one clock cycle). In the case of the former, as shown in Equation 2, the higher the operating frequency becomes, the larger the power consumption becomes. On the other hand, in the case of the latter, the larger the bit width to be processed, a distance of the wiring and the number of transistors becomes, the more Cd (dynamic capacitance) increases, so that the power consumption augments.

Figure 12:
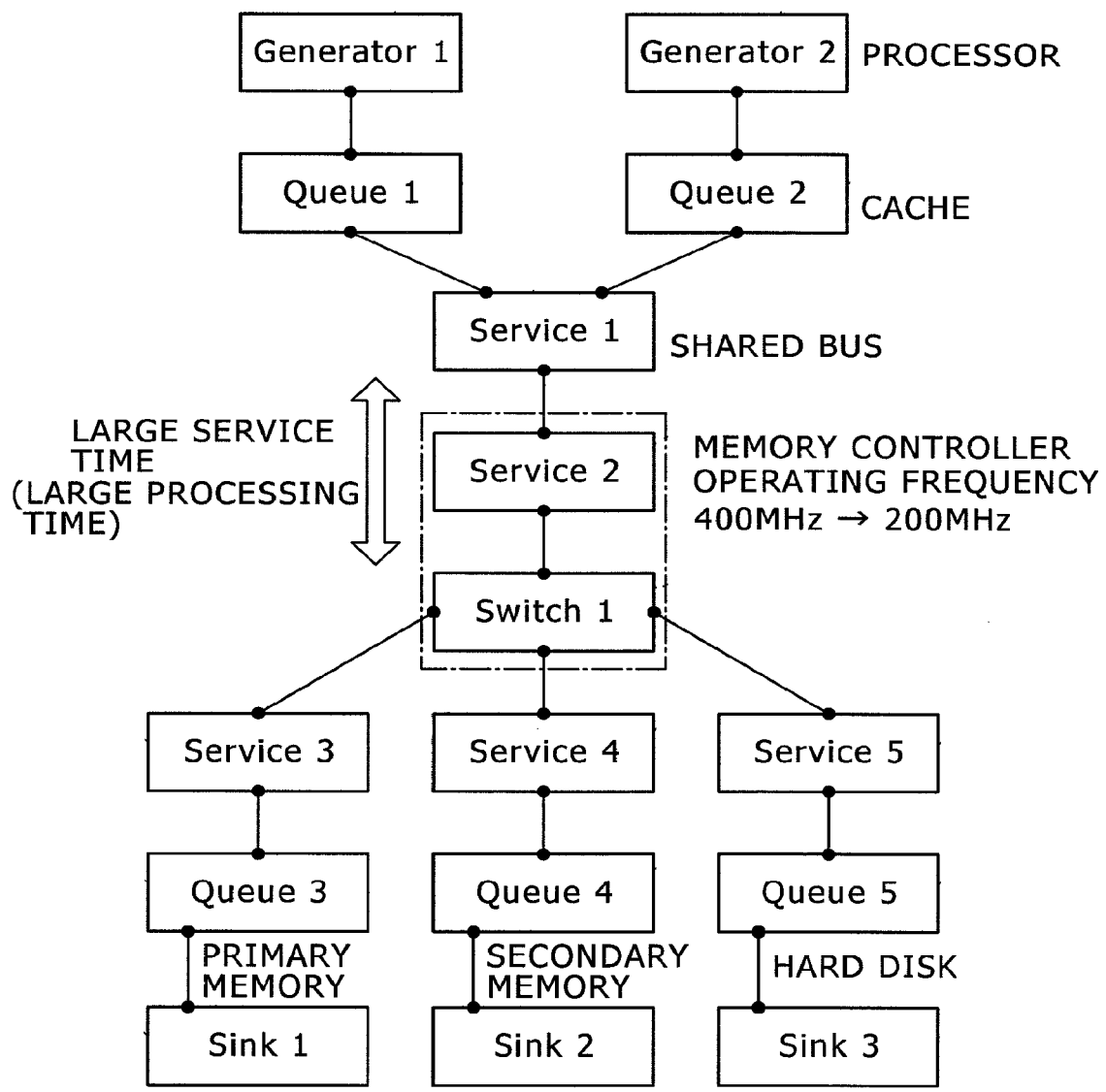
FIG. 12 shows the example of the system configuration defined in FIG. 11 defined employing the configured model according to the invention (the example represented with the discrete events model)

FIG. 12 shows an example (the example represented with the discrete events model) in which the system configuration defined in FIG. 11 is defined employing the configured model according to the invention, in which model the relationships illustrated in FIG. 11 are taken into account.

In FIG. 12, in order to reduce the power consumption, it is shown that the operating frequency of the memory controller is lowered. When such frequency is lowered, the event stay time of its 'Service 2' turns out to be longer, so that it is anticipated that the use rates of 'Queue 1' and 'Queue 2' increase. When the capacitances of those Queues overflow, an idle time occurs on processors ('Generator 1' and 'Generator 2' shown in FIG. 12), with the result that the processing performance lowers. However, providing that the idle time of the processors can be reduced by increasing the capacitance of the Queue sizes (e.g. 'Queue 1' and 'Queue 2' in which caches are rendered into models), the degree to which the processing performance deteriorates can be minimized as well as the power consumption can be lowered. In this way, the system operation can be balanced through the discrete events simulation and the computation employing information on the parts such as power consumption, a physical size, a circuit scale and an SER.

To note, in the database of the simulation apparatus shown in FIG. 1, an SER, power consumption, a physical size, a circuit scale as a whole or any combination of such information may be stored. In this case, those data may be inputted or stored also into the input section and the input data temporary storing section. The soft error rate computation processing section 6 performs the computation based on power consumption, a physical size, a circuit scale as a whole or in some cases based on any combination of such information.

As described above with the preferred embodiments of the invention, aiding computing an optimal value between the soft error rate and the processing performance of an electronically systematic product allows resistance against such error to be incorporated therein during the designing stage thereof so as to promote the high-reliability of such product and to reduce production cost as well as to lower power consumption.

LIST OF REFERENCE SIGNS 1 simulation apparatus, 2 input section, 3 input data temporary storing section, 4 database, 5 discrete events simulation section, 6 soft error rate computation processing section, 7 computation result temporary storing section, 8 computation result output controlling section, 21 processor 1, 22 processor 2, 23 shared bus, 24 memory controller, 25 primary memory, 26 secondary memory, 27 hard disk, 66 configured model definition section, 67 various information preserving section, 68 display section, 69 configured model redefinition determining section

The invention claimed is:

1. A simulation apparatus comprising:
a discrete events simulation processor configured to perform a discrete type simulation of a configured model comprising a plurality of different components based on attribute information associated with each of the plurality of different components of the configured model and based on connection information showing a connectional relationship among the plurality of different components of the configured model;
a soft error rate computation processor configured to perform a soft error rate computation by:
computing a soft error rate of the configured model as a whole comprising a combination of each of the plurality of different components based on a simulation result of the discrete events simulation processor, data on soft error rates in the attribute information, and by determining a relationship with a processing speed of each of the plurality of different components of the configured model; and
computing a soft error rate of each of the plurality of different components separately; and
a processor configured to:
determine whether or not the configured model is redefined based on a processing performance computed at the discrete events simulation processor and the soft error rate computed at the soft error rate computation processor; and
compute a model satisfying predetermined standards.

2. The simulation apparatus according to claim 1, wherein an average queue use rate, a service stay time and the processing performance that is a processing speed per component of the configured model are computed at the discrete events simulation processor, and wherein the soft error rate of the configured model is computed at the soft error rate computation processor based on the average queue use rate and the service stay time per component of the configured model computed at the discrete events simulation processor.

3. The simulation apparatus according to claim 2 further comprising:
a database to preserve the attribute information including at least the soft error rates of each of the plurality of different components of the configured model and to transmit the attribute information of each of the plurality of different components of the configured model to the discrete events simulation processor; and
a memory to store the connectional information among the plurality of different components of the configured model and to transmit the connectional information to the discrete events simulation processor.

4. The simulation apparatus of claim 1, wherein the predetermined standards are threshold values determined by a relationship between the processing performance and the soft error rate of the configured model.

5. The simulation apparatus of claim 1, further comprising:
a display configured to display computation results of the discrete events simulation processor and the soft error rate computation processor.

6. A simulation method comprising:
inputting a configured model as defined;
performing a discrete events simulation of a plurality of different components of the configured model based on attribute information associated with each of the plurality of different components of the configured model inputted at the inputting step and connection information showing a connectional relationship among the plurality of different components of the configured model;
processing a soft error rate computation by:
computing a soft error rate of the configured model as a whole comprising a combination of each of the plurality of different components based on a simulation result at the discrete events simulation step, data on soft error rates in the attribute information, and by determining a relationship with a processing speed of each of the plurality of different components of the configured model; and computing a soft error rate of each of the plurality of different components separately;

determining whether or not the configured model is redefined based on the processing performance computed at the discrete events simulation step and the soft error rate computed at the soft error rate computation processing step; and computing a model satisfying predetermined standards.

7. The simulation method according to claim 6, wherein at the discrete events simulation step an average queue use rate, a service stay time and a processing performance that is a processing speed per component of the configured model are computed, and wherein at the soft error rate computation processing step the soft error rate of the configured model is computed based on the average queue use rate and the service stay time per component of the configured model computed at the discrete events simulation step.

8. The simulation method according to claim 6, wherein the predetermined standards are threshold values determined by a relationship between the processing performance and the soft error rate of the configured model.

9. The simulation method according to claim 6, further comprising:

displaying computation results of the discrete events simulation step and the soft error rate computation processing step.

* * * * *